July 12, 1927.
H. E. SHAY
1,635,440
BUBBLE ABSORPTION TOWER
Filed April 6, 1926     2 Sheets-Sheet 1
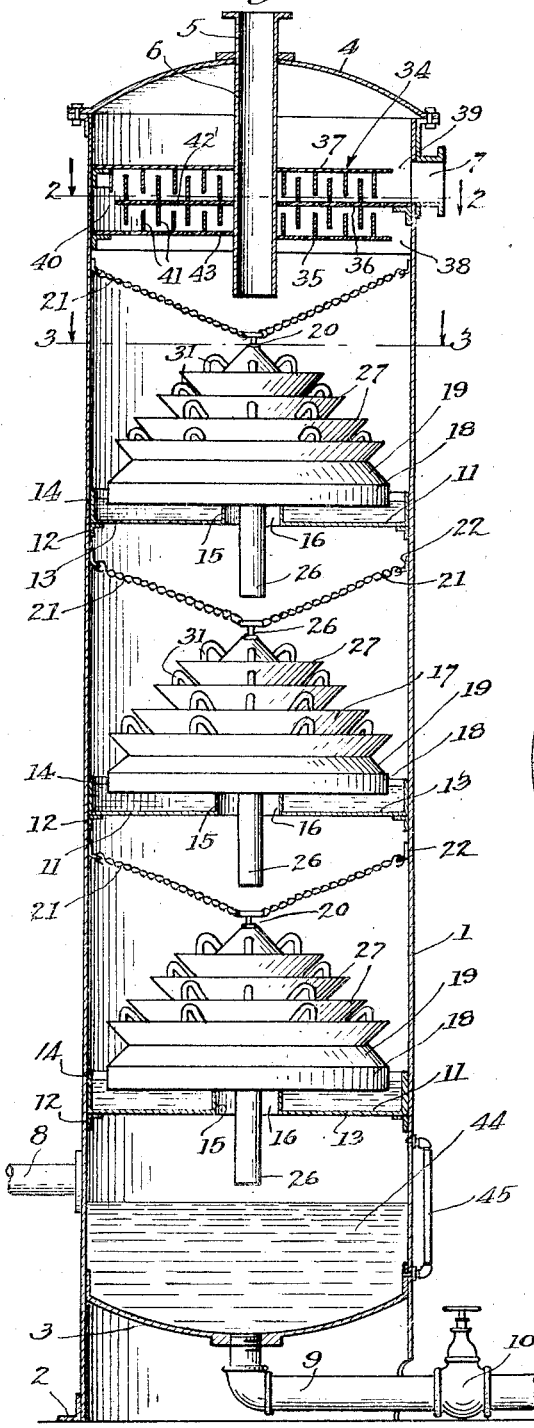
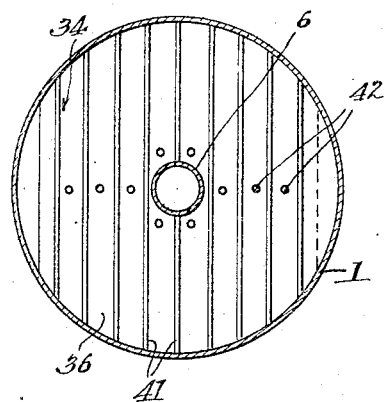
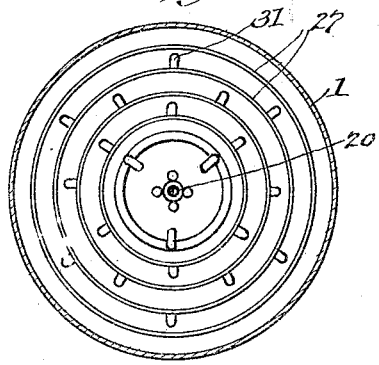
Inventor:
Harry E. Shay,
by Hazard and Miller
Attorneys

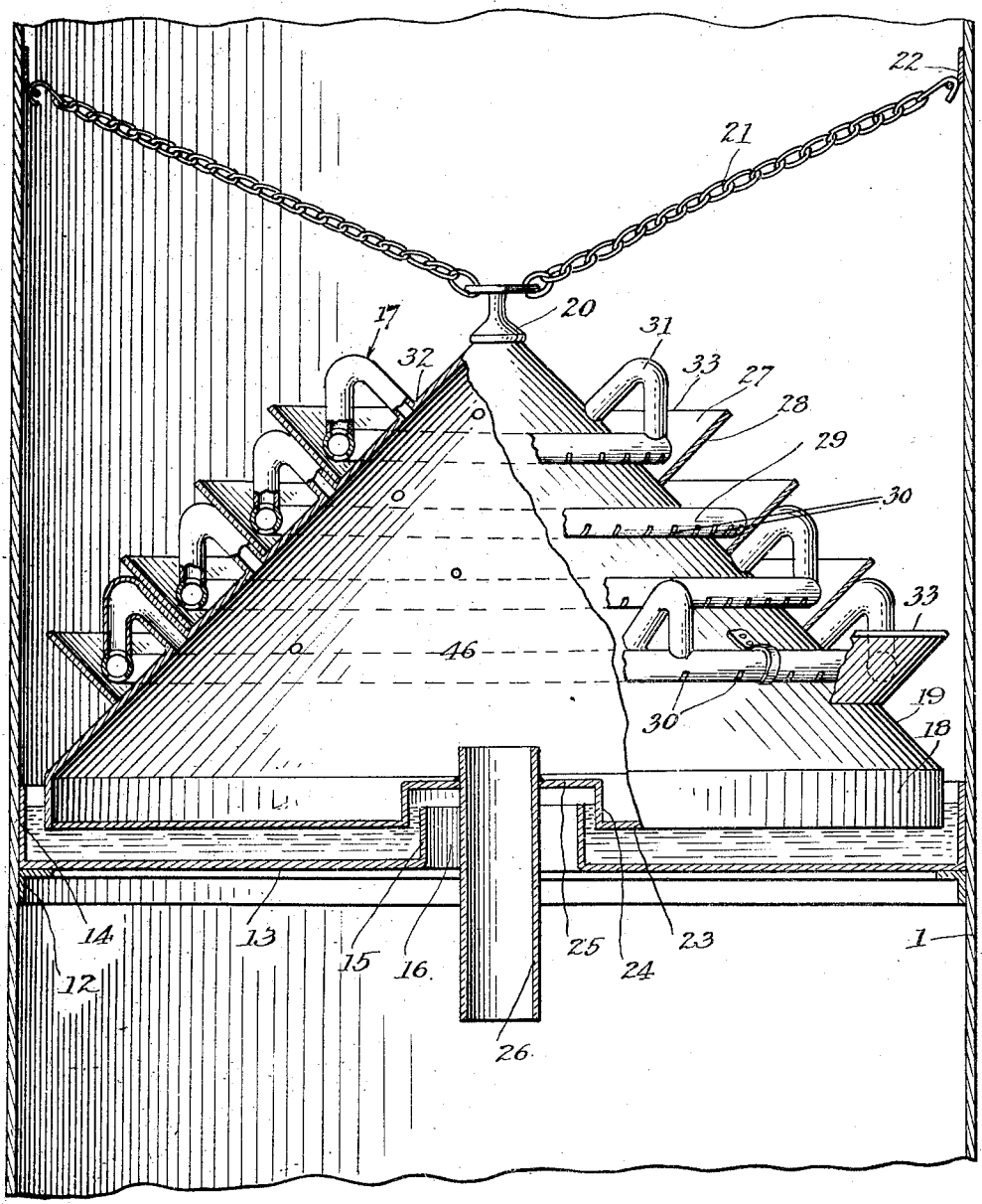

Patented July 12, 1927.

1,635,440

UNITED STATES PATENT OFFICE.

HARRY E. SHAY, OF LOS ANGELES, CALIFORNIA, ASSIGNOR OF ONE-THIRD TO W. A. MASTERS AND ONE-THIRD TO J. L. MURRAY, BOTH OF LOS ANGELES, CALIFORNIA.

BUBBLE-ABSORPTION TOWER.

Application filed April 6, 1926. Serial No. 100,056.

My invention is a bubble absorption tower for absorbing liquids from gases, by passing the gases through a liquid, and is particularly adapted for passing oil well or casing head gas through oil.

My invention also comprehends the method of operation.

A main object of my invention is to bubble gas through oil and my apparatus and method of operation are particularly designed to bubble oil well or what is known as casing head gas through oil; an object being to extract the condensable hydrocarbon oils in the gas into the body of oil, whereby the gas on leaving the absorption tower is comparatively dry. My apparatus and method, however, may be reversed in which a gas may be bubbled through a body of oil containing volatile oils so that the gas will take up a certain amount of the volatile oils and the resulting gas will therefore be a mixture of the original gas and the volatilized oils taken up thereby.

A more specific object of my invention is to bubble the gas through a series of troughs of oil in which the gas only bubbles through thin layers and the oil overflows from one trough into the next below, the overflow being substantially in the line of the upflowing gas. Hence an object of my invention is to bring the gas into intimate contact with a large amount of oil and to flow the oil downwardly through the tower in substantially the upward path of the gas.

Another object of my invention is to utilize a semi-floating gas chamber, the said chamber being floatable in a pan of oil and passing the gas from the gas chamber through a series of annular troughs; each trough being larger than the other and below the one above, so that the oil overflows from a higher trough to a lower trough.

In constructing my invention I utilize preferably a cylindrical tower and position therein a series of pans having an annular outlet in the center. Above these pans I suspend a conical gas chamber with a gas inlet through the opening in the pan. The gas chamber is preferably closed by a base and is partially floated by the oil in the pan; thereby being self-centering. The top and outside of the conical gas chamber are provided with a series of annular troughs, these increasing in diameter from the apex towards the base of the cone. Each of the troughs is provided with an annular perforated pipe and a series of gas pipes connecting through the wall of the cone to such perforated pipes.

The oil is fed into the top of the tower, dripping over the cones and from the upper troughs overflowing on to the troughs below; thence through the pans which partially float the gas chamber and thence to an oil receptacle at the base of the tower and to an oil outlet. The gas is given an auxiliary drying by a series of baffles at the top of the tower before being drawn off.

My invention is illustrated in connection with the apparatus shown in the following drawings, in which;

Figure 1 is a vertical mid section of my absorption tower;

Fig. 2 if a horizontal section on the line 2—2 of Fig. 1, in the direction of the arrows;

Fig. 3 is a horizontal section on the line 3—3 of Fig. 1, in the direction of the arrows;

Fig. 4 is a partial section and partial elevation through one of the conical gas bubbling units;

Referring particularly to Figs. 1, 2 and 3, my absorption tower comprises preferably a cylindrical structure 1 having a supporting base 2, a bottom wall 3 and a closure cap 4, an oil inlet 5, and preferably has an oil pipe 6 leading part way down in the tower. A gas outlet 7 is adjacent the top of the tower, a gas inlet 8 adjacent the base, and an oil outlet 9 controlled by a valve 10.

A series of annular pans 11 are mounted in the tower, each pan being preferably supported on a circular angle frame 12, the pans having a bottom 13, an outer rim 14, and an inner rim 15 forming a discharge opening 16 in the center of the pan. These details are shown more clearly in Fig. 4.

A series of conical gas bubbling units 17 are mounted in the tower; these units being constructed substantially as follows, particularly as illustrated in Figs. 1, 3 and 4:

Each of these units has preferably a cylindrical vertical wall 18 and a coned wall 19 extending thereabove to the apex 20 to which is attached a series of chains or cables 21 suspending the unit from hooks 22 on the walls of the tower. There are preferably at least three chains supporting each unit to hold same concentrically in the tower. A base wall 23, an annular vertical wall 24, a recessed wall 25 and the gas tube 26 form a closure at the base of the cone, allowing the inner rim 15 to extend upwardly into the recess.

A series of troughs 27 are formed by annular walls 28 projecting outwardly from the upper surface of the cone, these troughs therefore being triangular in cross-section as indicated in Fig. 4. Bubble pipes 29, having perforations 30 preferably on the lower side, are placed in the lowest position of each of the troughs and have a goose-neck pipe 31 leading from the apertures 32 in the cone to the bubble pipes. These goose-neck pipes extend above the upper edge 33 of the troughs in order to rise above the liquid level. The oil drips down on the center of the cone as hereunder set forth, fills up the upper trough and overflows the successive troughs into the pan, the oil level in the pan being controlled by the height of the inner rim 15.

A liquid separator 34 is installed in the upper part of the tower, being formed of a lower shelf 35, a middle shelf 36 and an upper shelf 37. The bottom and the top shelf have passages 38 and 39 on one side of the tower and the middle shelf has an opening 40 on the opposite side. A series of baffle walls 41 extend transversely across the shelves, projecting upwardly and downwardly from the lower and upper shelves and in both directions from the middle shelf, causing a zig zag movement of the gas. A series of small perforations 42 and 43 are formed in the middle and lower shelf to allow drainage of any oil trapped in the lower part of the separator. The lower part of the tower forms an oil receptacle 44 which has preferably an oil level glass 45 indicating the proper level of oil to the operator.

The manner of operation is substantially as follows:

It will be understood that the tower may be of any height desired and of any suitable diameter and as few or as many pans and bubble units installed as may be desired, the illustration showing three of these sets. Oil is fed into the tower through the pipe 5, flowing down over the upper cone until the pan in the lowermost unit is filled and there is a body of oil in the reservoir to prevent the gas from blowing through, the gas being blown in under suitable pressure through the pipe 8. As the gas flows upwardly through the gas pipes 26 it enters the gas chambers 46 in the cones and passes out through the apertures 32 and the goose-neck pipes into the bubble pipes 29 which are located in the troughs 27.

It will be noted that there is a limited depth of oil in these troughs and that as oil is continuously entering the tower it flows downwardly over the cone and in succession over the edges of the troughs. The flow of oil over the walls 28 is in substantially a vertical line with the upward flow of the bubbles from the perforations 30, hence the dripping oil is brought into close contact with the upwardly flowing gas.

A feature of my invention is in having the pans 11 of sufficient depth with the bottom of the recess having a sufficient rise so that the cones are partly floated in the pans. This acts to center the gas chambers in proper relation to the tower and maintains a proper level of the oil in the various troughs this being always horizontal so that there is no opportunity for one side of the bubble pipes to be uncovered by the oil. The gas after going upwardly through the different units and through the separator 34 is carried out through the outlet pipe 7 and as the oil accumulates in the oil receptacle 44, is drawn off by the pipe 9 controlled by the valve 10.

Although I have described my bubble absorption tower as being primarily designed for extracting condensable oils or other liquids from gas, it is nevertheless to be understood that the reverse operation may take place and that dry gases may be caused to absorb various volatile liquids and be carried off as a wet gas or the like.

Although my invention is of a simple character, it is nevertheless apparent that the general construction and specific details may be considerably changed to suit different types of towers or other gas and liquid interchanging mechanism. Such changes would be within the spirit of my invention as set forth in the description, drawings and claims.

Having described my invention, what I claim is:

1. An absorption tower comprising in combination a tower structure having a partly floatable gas chamber, means to hold and retain oil flowing over the outside of said chamber, and means for bubbling gas from said chamber through the oil.

2. An absorption tower comprising in combination a tower structure, a partly floatable gas chamber having a series of oil receiving troughs on its outer surface, and means for bubbling gas from the gas chamber through the said troughs.

3. An absorption tower as claimed in claim 2, in which the troughs are arranged in cascade with the oil flowing successively from a higher to a lower tray.

4. An absorption tower comprising in combination a tower structure, a conical shaped gas chamber, means for holding and retaining oil on the conical outside of said chamber, and means for bubbling gas from the chamber through the oil.

5. An absorption tower comprising in combination a tower structure having a conical gas chamber with a series of annular troughs, the troughs being arranged at different levels, and means for conducting gas from the gas chamber to and through bubble pipes in the said troughs.

6. An absorption tower as claimed in claim 5, in which the troughs are arranged at different elevations on the conical part of the chamber, the oil flowing in cascade from a higher to a lower trough.

7. A bubble absorption tower comprising in combination a tower structure, a pan for oil therein, a conical-shaped gas chamber partly floatable in said pan, a series of annular troughs on the exterior surface of the cone, bubble pipes in the base of the troughs, gas feed pipes from the gas chamber to the bubble pipes, and means to conduct gas upwardly into the gas chamber.

8. A bubble tower comprising in combination a tower structure having a pan with an outer and inner rim, the inner rim forming a central opening, a conical gas chamber having a substantially flat base with a recess, the recess fitting over the inner rim, a gas inlet pipe extending downwardly from the recess, through the opening in the pan, means on the exterior conical surface to retard the flow of oil thereover, and means leading from the gas chamber to pass gas through the said oil.

9. A bubble tower as claimed in claim 8, in which the means to retard the oil and to pass the gas comprises a series of annular troughs mounted on the exterior surface of the cone, bubble pipes in the lower part of the troughs, and gas supply pipes leading from the cone into the bubble pipes, the troughs being at different elevations, whereby the oil flows in cascade from a higher to a lower trough.

10. A bubble tower as claimed in claim 8, having in addition means to suspend the conical gas chamber from the walls of the tower, whereby said gas chamber is partly supported and partly floated in the said pan.

11. A bubble absorption tower comprising in combination a cylindrical tower structure, a series of pans having central openings at different elevations, a series of conical gas chambers partly floatable in the pans, the chambers having a gas inlet below the pans, a series of troughs on the exterior surface of the cones, means to bubble gas from the gas chambers through the troughs, an oil inlet at the top and outlet at the bottom of the tower, and a gas inlet at the bottom and outlet at the top of the tower.

12. A bubble absorption tower as claimed in claim 11, having in addition a liquid separator in the upper part of the tower comprising a lower, an upper and an intermediary shelf extending part way across the tower from opposite sides, and baffle walls from the said shelves extending in an overlapping direction from one shelf towards another.

13. In a bubble absorption tower, a liquid separator comprising a lower and upper shelf extending part way across the tower structure, an intermediate shelf extending part way across the tower from the opposite side, a series of baffle walls extending upwardly and downwardly from the upper and lower shelf and from the intermediate shelf, the said walls overlapping thereby forcing gas to follow an up and down zig zag path.

14. In the method of absorption of gases and liquids comprising maintaining a continuous supply of gas in a partially floatable gas chamber, flowing oil in a retarded manner over the outside surface of said chamber, and passing gas through such oil from the gas chamber.

15. In the method of absorption of gases and liquids, maintaining a continuous supply of gas in a partially floatable gas chamber, flowing a liquid in cascade through a series of oil receptacles on the outside of said chamber, and passing gas from the chamber in bubbles through the oil in the different steps of the cascade flow.

16. In the method of gas and liquid absorption, flowing a liquid downwardly through a series of circular liquid receptacles of increasing diameter, discharging the liquid from the upper to the lower receptacles in circular cascades, and bubbling gas upwardly through each of the receptacles.

17. In the method of gas and liquid absorption, flowing a liquid downwardly through a series of circular liquid receptacles of increasing diameter, discharging the liquid from the upper to the lower receptacles in circular cascades, and bubbling gas upwardly through each of the receptacles, the liquid flowing in cascades being substantially in the path of the upward flow of the bubbles.

In testimony whereof I have signed my name to this specification.

HARRY E. SHAY.